Figure 1:
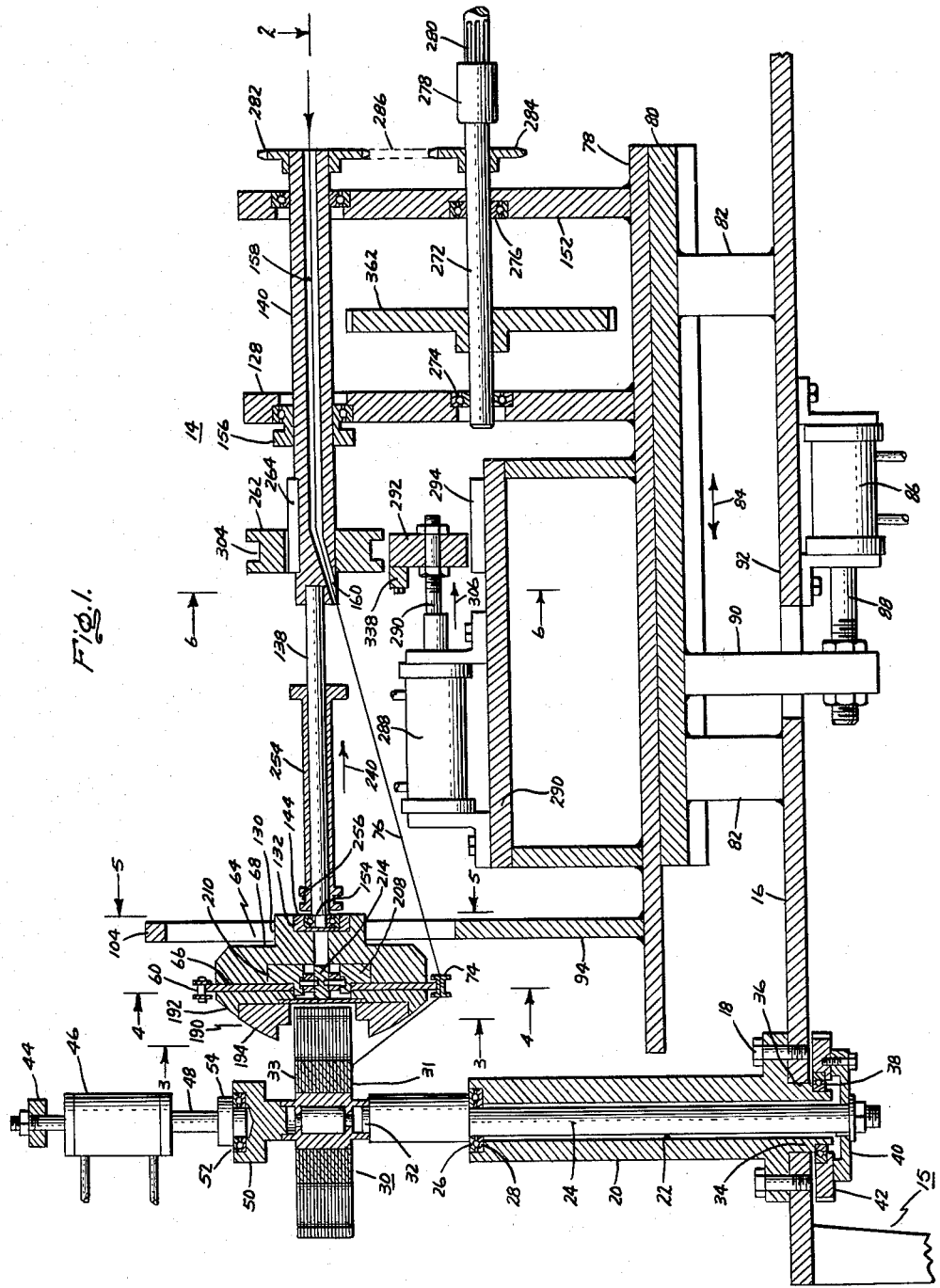

July 23, 1963

R. J. EMINGER 3,098,616

COIL WINDING MACHINE

Filed March 20, 1961

6 Sheets-Sheet 1

Inventor:
Robert J. Eminger,
by Just & Trish
Attorneys.

July 23, 1963 R. J. EMINGER 3,098,616
COIL WINDING MACHINE
Filed March 20, 1961 6 Sheets-Sheet 2

Inventor:
Robert J. Eminger,
by Gust & Irish
Attorneys.

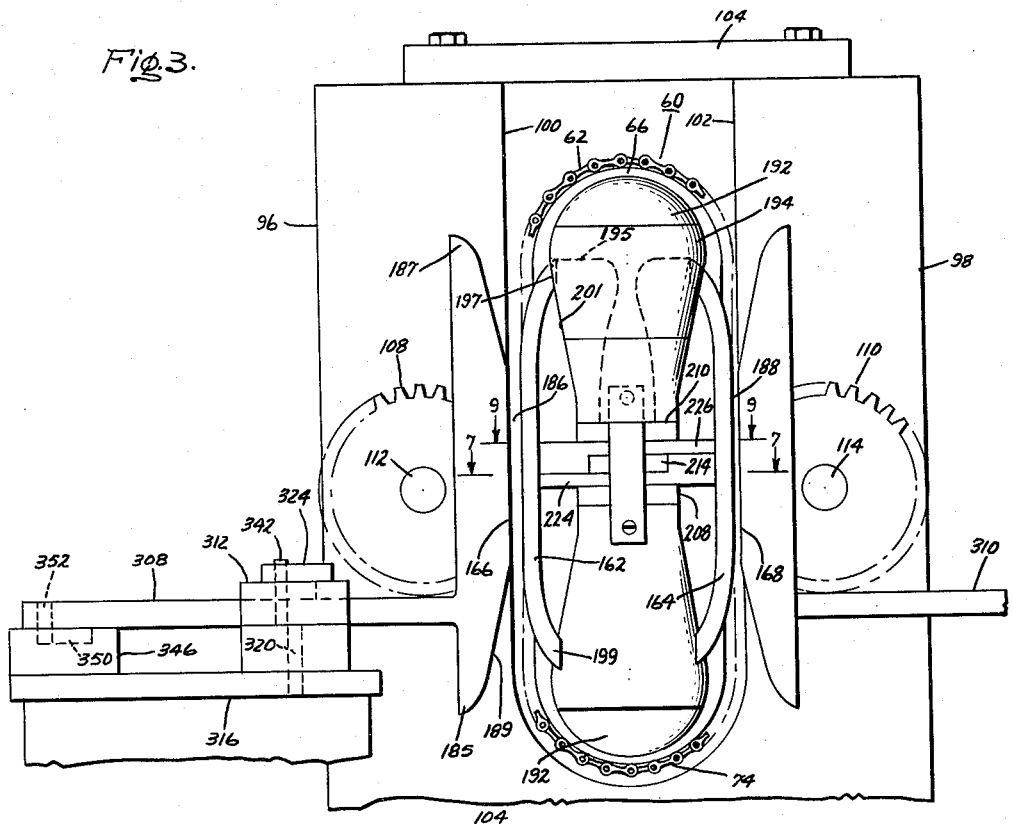
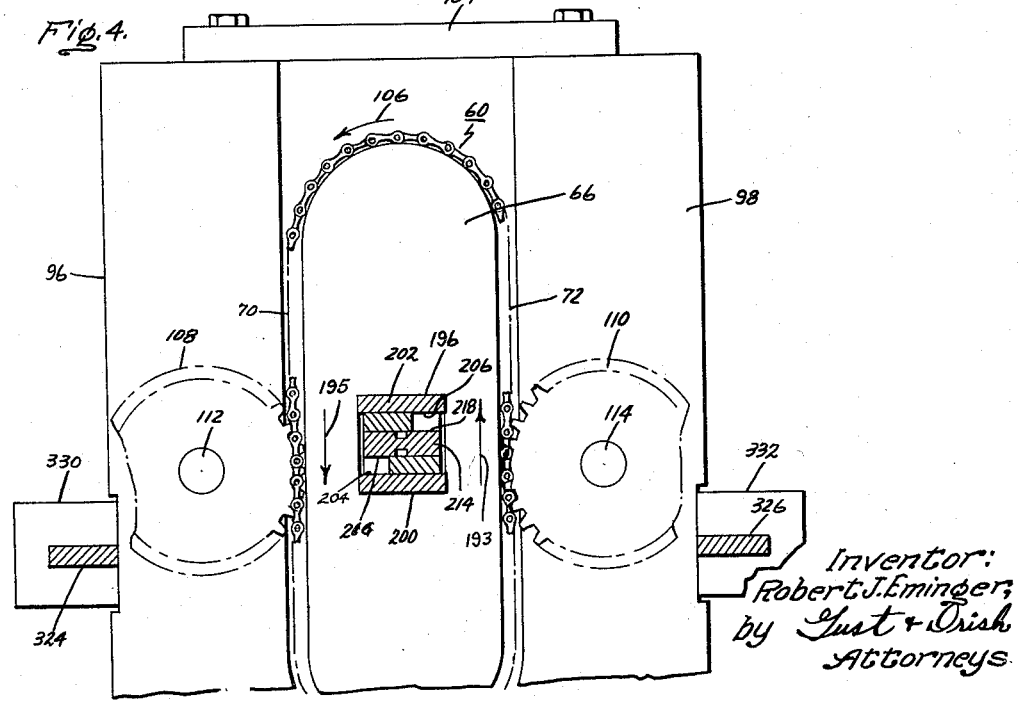

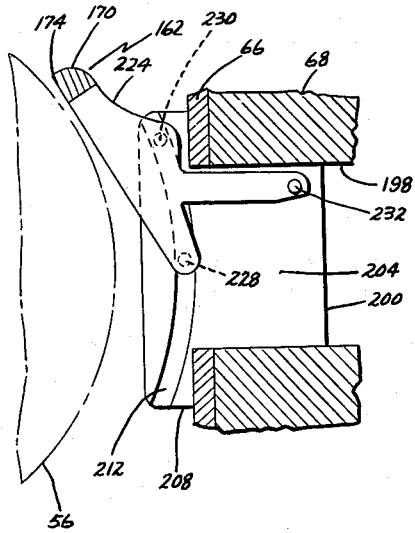
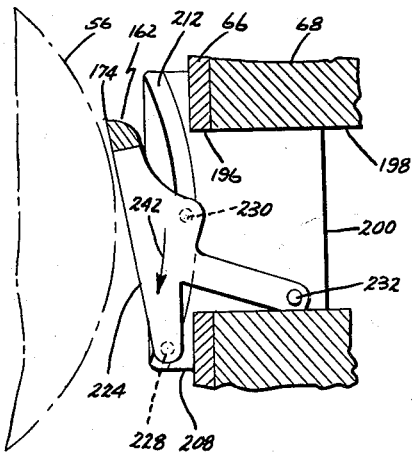
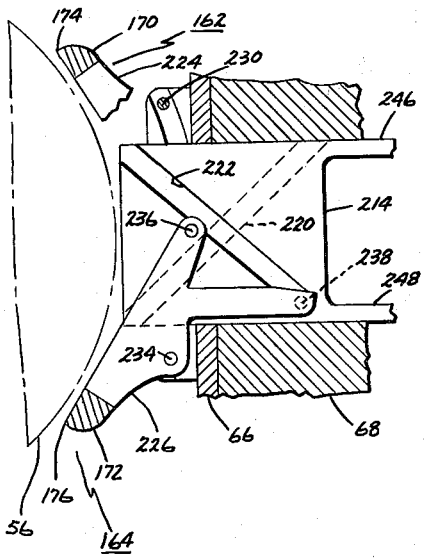
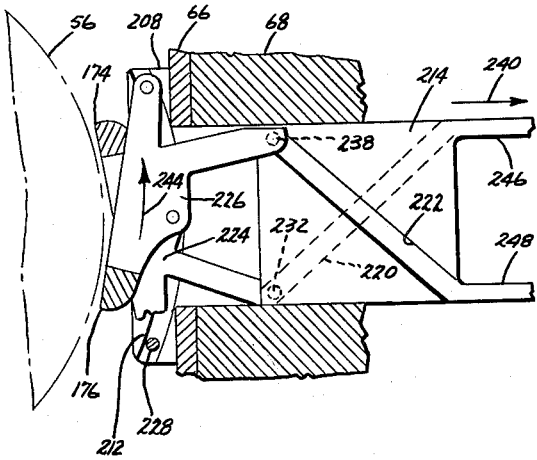
Inventor:
Robert J. Eminger,
by Lust & Irish
Attorneys.

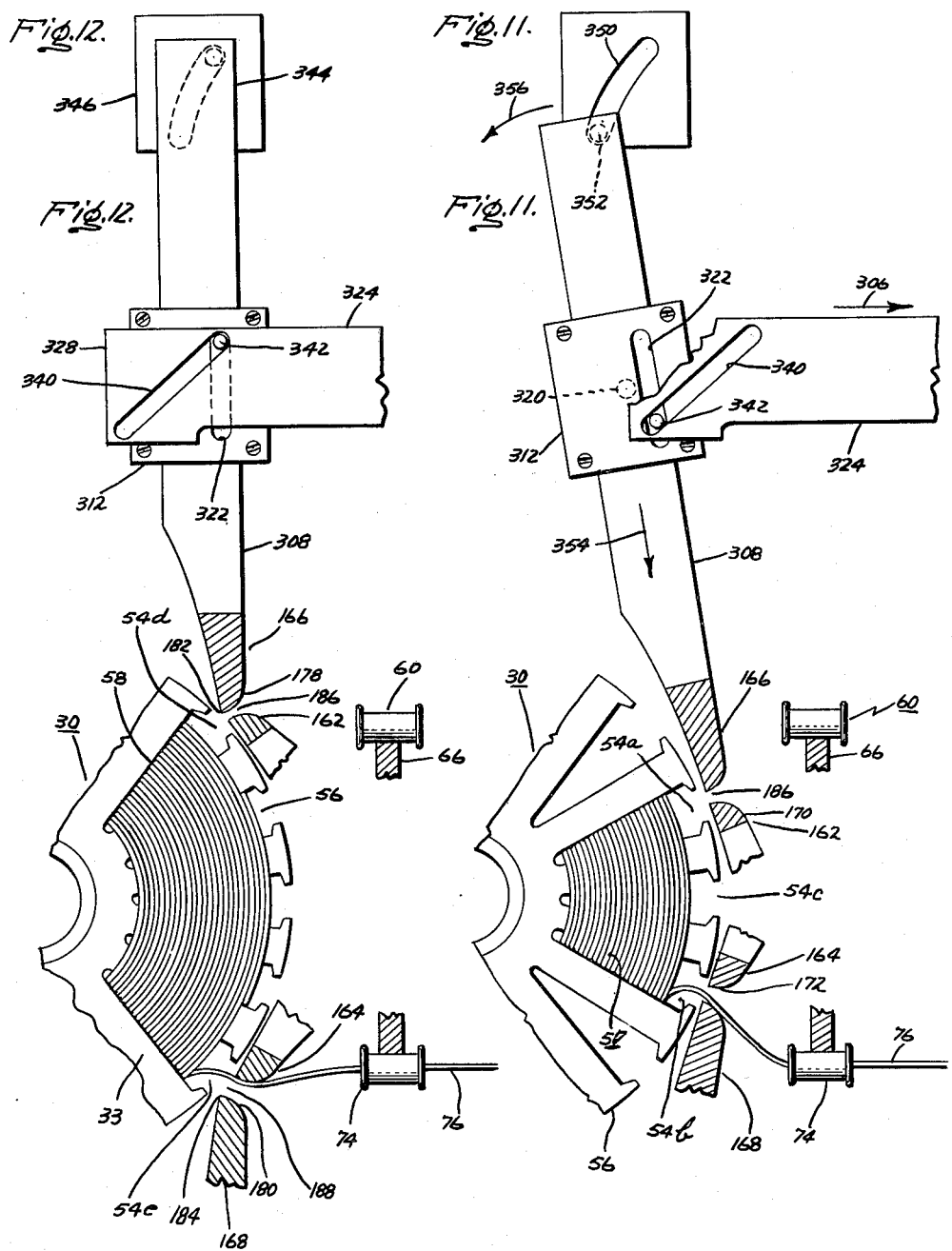

United States Patent Office 3,098,616
Patented July 23, 1963

3,098,616
COIL WINDING MACHINE
Robert J. Eminger, Kendallville, Ind., assignor to Fort Wayne Tool and Die, Inc., Fort Wayne, Ind.
Filed Mar. 20, 1961, Ser. No. 97,052
13 Claims. (Cl. 242—13)

This invention relates generally to coil winding machines, and more particularly to a machine for winding coils in the slots of an externally slotted magnetic core member, such as a dynamoelectric machine core member.

The stator member of conventional dynamoelectric machines comprises a magnetic core having a bore in which the rotor is positioned with winding slots extending radially outward from the bore, and field coils positioned in the core slots; such a magnetic core is referred to as being internally slotted. Many machines have been provided for winding coils directly in the slots of an internally slotted stator core member, or for placing prewound coils in such slots, including the apparatus of Patent 2,738,136 to Kenly C. Bugg which employs an endless chain for carrying the wire to the slots and forming the coils.

Dynamoelectric machines are now being constructed having externally slotted stator core members, i.e. with the winding slots extending radially inward from a peripheral face of the core member and it is therefore desirable to provide a machine for winding coils in the slots of such externally slotted core members at high speed. Further, it is frequently desirable to wind two or more concentric coils in respective pairs of slots of an externally slotted core member and it is therefore desirable that such a machine be capable of consecutively winding such concentric coils.

It has been found to be impractical to wind externally slotted dynamoelectric machine core members with a machine of the so-called gun-type such as that shown in Patent 2,847,170 to John F. Lill, nor is it practical to prewind the coils and then to insert them in the slots in the manner contemplated in Patent 2,836,204 to Lowell M. Mason. Attempts have also been made to employ a coil winding machine of the flyer type for winding such externally slotted core members, such a machine employing a crank rotating in a plane parallel with the core member and having an eye through which the wire passes. However, in such an arrangement, the circle through which the eye travels has a greater diameter than the spacing between the slots in which the coil is being wound thus requiring the use of kick-off devices for inserting the wire in the slots, thus limiting the winding speed and increasing the danger of damage to the insulation of the wire.

It is accordingly an object of my invention to provide an improved machine for winding coils in the slots of an externally slotted core member.

Another object of my invention is to provide an improved machine for winding coils in the slots of an externally slotted core member capable of operation at relatively high speeds.

A further object of my invention is to provide an improved machine for winding coils in the slots of an externally slotted core member capable of winding concentric coils in at least two pairs of slots.

Yet another object of my invention is to provide an improved machine for winding coils in the slots of an externally slotted core member wherein the wire is directly inserted in the slots without requiring auxiliary devices.

A still further object of my invention is to provide a machine of the type employing endless flexible drive means for carrying the wire to the slots and winding the same therein.

My invention in its broader aspects comprises endless flexible wire carrying means, such as a chain, with means interiorly of the carrying means for forming the carrying means so as to have two runs respectively parallel with the two slots of the core into which the coil is to be wound. Means are provided exteriorly of the carrying means for driving the carrying means continuously in one direction and the carrying means is provided with means thereon and driven therewith for feeding a continuous length of wire to the core. First wire guide means is provided on the forming means and having edges respectively parallel with the two runs of the carrying means and a pair of second guide means are provided respectively having edges positioned closely spaced from first wire guide means and parallel therewith. The edges of the first and second wire guide means are respectively disposed adjacent the core being wound with the spaces between the edges of the first and second wire guide means respectively being in alignment with the slots in which the coil is to be wound so as to guide the length of wire from the endless carrying means into the two slots. Thus, the drive means carries the wire along one run thereof feeding the same into one slot of the core through the space between the first wire guide means and one second wire guide means, the carrying means then carrying the wire from one run to the other run forming at the same time one end turn of the coil. The carrying means then carries the wire along the other run in the opposite direction feeding the wire directly into the other slot between the first wire guide means and the other second wire guide means and finally carries the wire back to the first run thereby forming the other end turn of the coil.

In the preferred embodiment of my invention, the forming means is supported and thrust is exerted thereon by a shaft rotatably journalled therein and extending outwardly therefrom in a direction away from the core being wound and on an axis perpendicular thereto. The shaft has a coaxial opening formed therein from its other end toward the forming means and an opening formed in its periphery joining the coaxial opening, the wire being wound passing through the other and coaxial openings to the wire carrying means. The shaft is supported by bearing means intermediate the other opening and its other end and means are provided for driving the shaft at the same rotational speed, i.e., in synchronism with the chain.

In another preferred embodiment of my invention, means are provided for moving the respective edges of the first and second wire guide means along arcuate paths from first to second positions thereby consecutively to wind two concentric coils in two pairs of slots in the core member.

Further objects and advantages of my invention will become apparent by reference to the following description and the accompanying drawings, and the features of novelty which characterize my invention will be pointed out with particularity in the claims annexed to and forming a part of this specification.

Figure 2:
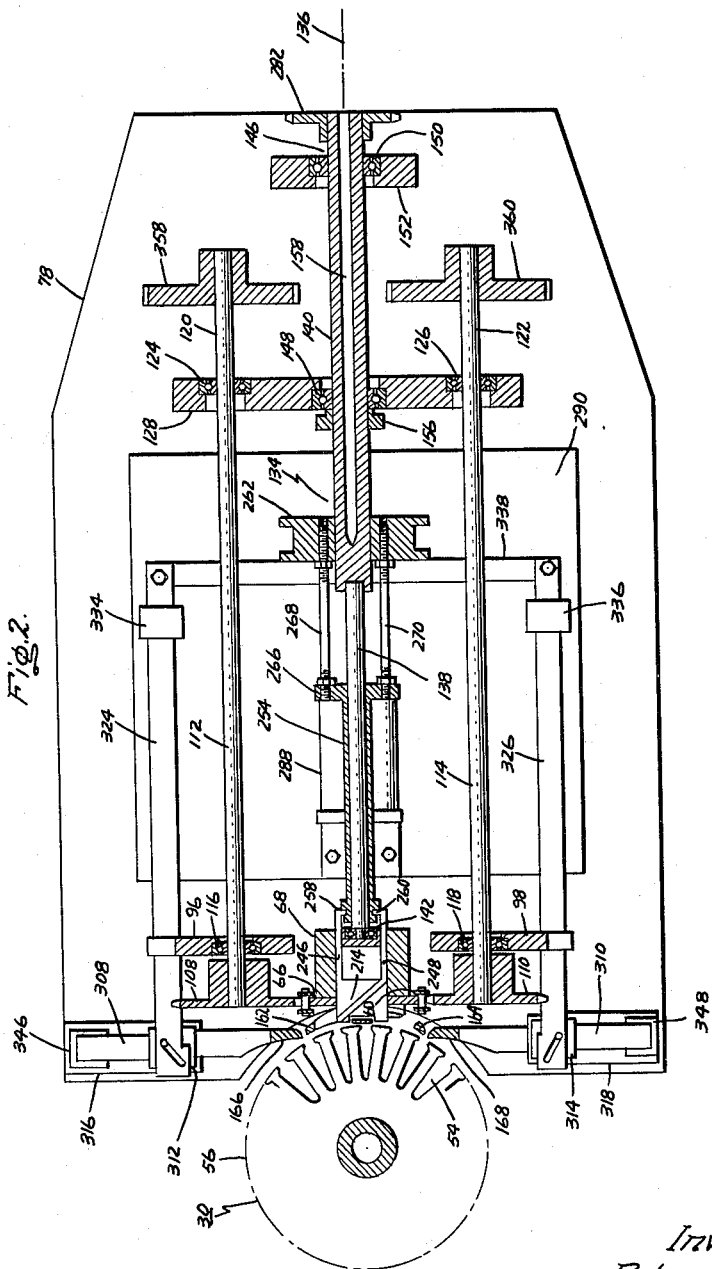
Figure 5:
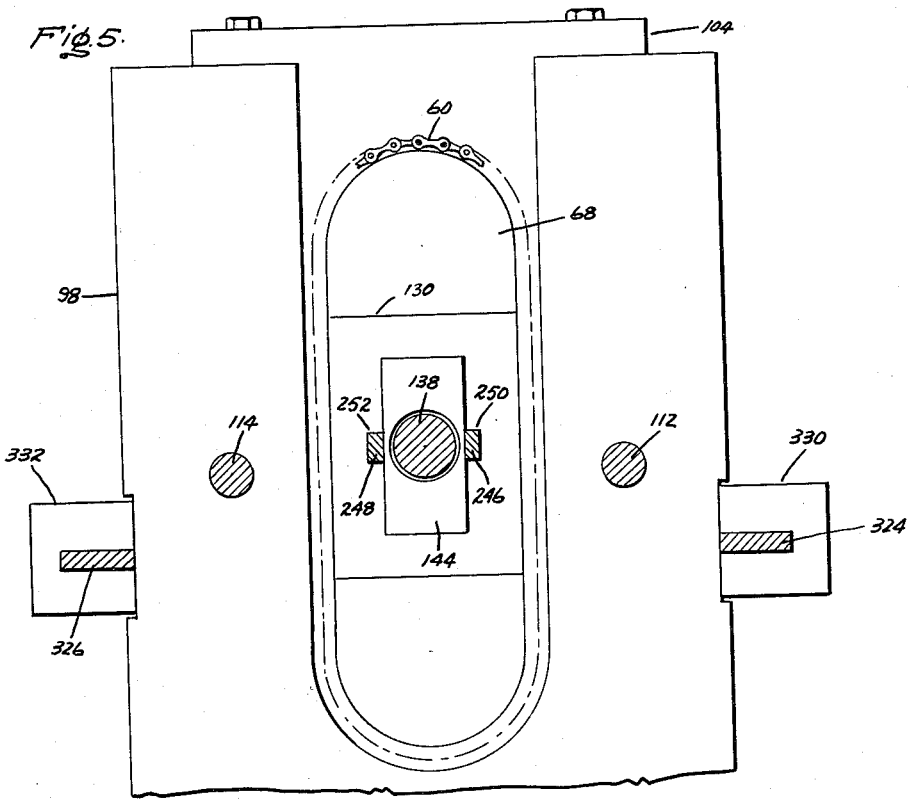
Figure 6:
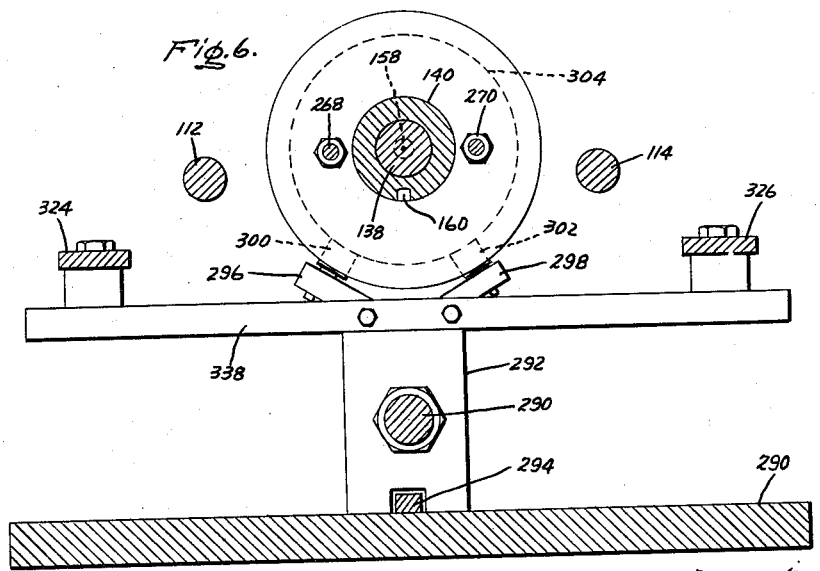

In the drawings:

FIG. 1 is a side view, partly in cross-section and partly broken away illustrating the preferred embodiment of my invention;

FIG. 2 is a view taken along the line 2—2 of FIG. 1;
FIG. 3 is a view taken along the line 3—3 of FIG. 1;
FIG. 4 is a view taken along the line 4—4 of FIG. 1;
FIG. 5 is a view taken along the line 5—5 of FIG. 1;
FIG. 6 is a view taken along the line 6—6 of FIG. 1;
FIGS. 7 and 8 are fragmentary cross-sectional views taken along the lines 7—7 of FIG. 3 and illustrating the movement of the inner wire guide members of the machine of the previous figures;

FIGS. 9 and 10 are fragmentary cross-sectional views taken along the line 9—9 of FIG. 3 and further illustrating the movement of the inner wire guide members; and FIGS. 11 and 12 are fragmentary cross-sectional views illustrating the movement of the outer wire guide members and the winding of concentric coils in two pairs of slots of an externally slotted dynamoelectric machine core member.

Referring now to the figures of the drawing, my improved machine for winding coils in the slots of an externally slotted core member, generally identified at 14, is supported on a frame 15 having a base plate member 16. Secured to the base plate member 16 by suitable studs 18 is a vertically upstanding column member 20 having a coaxial opening 22 formed therein. A rotatable shaft 24 extends upwardly through opening 22 and has a shoulder 26 at its upper end engaging a suitable thrust bearing 28 seated in a recess at the upper end of column 20. An externally slotted dynamoelectric machine core member 30 is supported on the upper end 32 of shaft 24 so that its axis is coaxial with the axis of shaft 24. Column 20 has a portion 34 extending downwardly through an opening 36 in base plate member 16 and having a suitable bearing 38 seated thereon below base plate 16, as shown. An annular ring 40 is secured to the bottom end of shaft 24 in any suitable manner and has an annular gear 42 secured thereto as shown, bearing 38 engaging the inner surface of gear 42. It will thus be seen that bearings 38 and 28 serve rotatably to support shaft 24. Gear 42 is driven by suitable indexing apparatus (not shown) for indexing core 30 so as to wind coils in the desired slots.

In order to complete the support of core 30 for winding coils thereon, a frame element 44 is provided disposed above core 30 and suitably connected to base plate 16. Attached to frame element 44 and depending therefrom is a suitable hydraulic cylinder 46. Hydraulic cylinder 46 is disposed on the axis of core 30 and shaft 24 and has a piston rod 48 extending downwardly therefrom. A plug member 50 coaxially engages the end of core 30 on the opposite side from end 32 of shaft 24. A suitable bearing 52 is seated in a recess in the upper side of plug 50 in which end 54 of piston rod 48 is seated, as shown. It will thus be seen that when a completely wound core member is to be removed from the machine, and an unwound core placed in position for winding, cylinder 46 is actuated to retract piston 48 and plug 50. When the wound stator is removed and an unwound stator replaced on end 32 of shaft 24, cylinder 46 is again actuated to move piston 48 downwardly until plug 50 engages the upper end of the core 32. Bearing 52 is provided in order to permit indexing of the core 30.

Core 30, which may be formed of a stacked plurality of relatively thin laminations of magnetic material, is cylindrical and has a plurality of winding slots 54 extending radially inward from its peripheral face 56. In the particular core member shown in the drawings, which is a stator core member for distributed winding, single phase alternating current induction motor, it is desired to wind a plurality of pairs of concentric coils 57 and 58 in respective pairs of winding slots 54, each inner coil 57 having its coil sides respectively positioned in slots 54a and 54b with an intermediate slot 54c therebetween, and each outer coil 58 having its coil sides respectively positioned in slots 54d and 54e, as best seen in FIGS. 11 and 12. It will be seen that the inner coil 57 thus spans three slots and that the outer coil 58 spans five slots with the end turns of each coil being disposed on the top and bottom faces of core 30.

In order to wind concentric coils 57 and 58 directly into slots 54 of core 30, I provide an endless chain 60 formed of a plurality of links 62. Chain 60 is disposed in a plane parallel with the axis of core 30 and spaced from its peripheral face 56. A forming block assembly 64 is provided comprising a forming plate 66 and block 68 secured thereto. Forming plate 66 engages the inner side of chain 60 forming and guiding the same to have two parallel runs 70 and 72 respectively parallel with the axis of core 30 and winding slots 54. Chain 60 has an eyelet 74 formed in one of its links which guides wire 76 to core 30 as will be hereinafter more fully described.

A movable base plate member 78 is provided parallel with the base plate and spaced thereabove as shown in FIG. 1. Suitable ways 80 are secured to the bottom surface of movable base plate member 78 with bearing blocks 82 which are secured to base plate 16 being seated therein, thus supporting movable base plate 78 for horizontal movement in the direction shown by the arrows 84. Movable base plate 78 and the apparatus supported thereon, to be hereinafter described, is moved horizontally by means of a suitable hydraulic cylinder 86 secured to the bottom surface of base plate 16. Piston rod 88 of hydraulic cylinder 86 is attached to a projection 90 which extends upwardly through slot 92 in base plate 16 and is secured to base plate 78. Thus, selective actuation of hydraulic cylinder 86 moves movable base plate 78 horizontally, as shown.

A vertically disposed frame member 94 is provided secured to movable base plate member 78 and having portions 96 and 98 extending upwardly along either side of block 68. It will be seen that the inner faces 100 and 102 of frame portions 96 and 98 are parallel with runs 70 and 72 of chain 60 and spaced apart by a distance slightly greater than the spacing between the outer sides of chain runs 70 and 72, thus permitting assembly and disassembly of the chain and forming block assembly. A suitable member 104 is secured to the upper ends of frame portions 96 and 98, as shown in FIGS. 3, 4 and 5.

Chain 60 is continuously driven in one direction, such as shown by arrow 106 in FIG. 4 by a pair of sprocket wheels 108 and 110 respectively engaging the outer sides of runs 70 and 72 of chain 60. Sprocket wheels 108 and 110 are respectively secured on shafts 112 and 114 parallel with movable base plate 78 and respectively journalled in bearings 116 and 118 secured in frame portions 96 and 98. Shafts 112 and 114 are elongated with their rear ends 120 and 122 being respectively supported by bearings 124 and 126 secured in a vertically extending frame member 128 which in turn is secured to movable base plate 78, as seen in FIG. 1.

The rear side of block 68 has a projection 130 formed thereon with a recess 132 formed therein. An elongated shaft 134 is provided extending rearwardly from block 68 and disposed on an axis 136 perpendicular to the axis of core 30. Shaft 134 is formed of two coaxial parts 138 and 140, as best seen in FIGS. 1 and 2. Shaft part 138 has its inner end journalled in a thrust bearing 142 secured in a block 144 positioned in recess 132 of projection 136 of block 168. The outer end 146 of shaft 140 is rotatably supported by bearing 148 in frame member 128 and bearing 150 and vertically extending frame member 152 also secured to movable base plate member 78, as seen in FIG. 1. It will be observed that the inner end of shaft 138 has a shoulder 154 cooperating with the thrust bearing 142 and that a thrust collar 156 is provided on shaft part 140 cooperating with bearing 148 thus resisting thrust applied to the winding chain assembly by the build-up of wire in the coils 56 and 58 as they are wound on the slots 54.

A coaxial opening 158 is formed in shaft part 140 extending from end 146 nearly to the junction of shaft part 138 with shaft part 140, and another opening 160 is formed in the periphery of shaft part 140 adjacent its junction with shaft part 138 and extending inwardly to communicate with coaxial opening 158. As will be seen in FIG. 1, wire 76 extends through openings 158 and 160 to eyelet 74.

In order to guide the wire 76 from eyelet 74 into slots 54 of core 30, elongated inner wire guide members 162 and 164 and cooperating elongated outer wire guide members 166 and 168 are provided. As best seen in FIGS. 7 through 12, the portions of the inner wire guide members 162 and 164 intermediate their ends respectively have curved surfaces 170 and 172 terminating in edges 174 and 176 which are respectively parallel with runs 70 and 72 of chain 60 and closely spaced from the peripheral face 56 of core 30. The outer wire guide members 166 and 168 intermediate their ends also respectively have curved surfaces 178 and 180 terminating in edges 182 and 184 which are likewise closely spaced from the peripheral face 56 of core 30 and respectively parallel with edges 174 and 176 of the inner wire guide members 162 and 164. Edges 174 and 182 of inner and outer wire guide members 162 and 166 respectively define an elongated narrow slot 186 and edges 176 and 184 of inner and outer wire guide members 164 and 168 respectively define another elongated slot 188, as seen in FIGS. 11 and 12. Elongated slots 186 and 188 are thus respectively parallel with runs 70 and 72 of chain 60 and with the slots 54 of core 30. Elongated slots 186 and 188 further are disposed respectively in alignment with the core slots in which a coil is to be wound. Thus, assuming that the inner coil 56 is to be wound in slots 54a and 54b, elongated openings 186 and 188 are disposed respectively in radial alignment with core slots 54a and 54b.

To wind coil 57, end 190 of wire 76 is temporarily secured to the face 31 of core 30 with the chain 60 positioned so that the eyelet 74 is midway between runs 70 and 72 as shown in FIGS. 1, 3 and 4. With the chain 60 then driven in the direction shown by the arrow 106, eyelet 74 will be moved upwardly along run 72 in the direction shown by the arrow 193, with the wire being guided between curved surfaces 172 and 180 and edges 176 and 184 of wire guides 164 and 168 through the slot 54b. As the eyelet 74 goes over the top of forming plate 66 from one run 72 to run 70, the wire 76 is carried from core slot 54b to core slot 54a thus forming one end turn of the coil on face 33 of core 30. Then, as the eyelet 74 is moved downwardly along run 70 in the direction 195, wire 76 is carried between curved surfaces 170 and 176 and edges 174 and 182 of wire guide members 162 and 166 and through slot 54a. Finally, as the eyelet 74 is carried around the bottom edge of forming plate 66 between runs 70 and 72, the wire 76 is carried back across the face 31 of the core from slot 54a to 54b thus forming the other end turn of the coil. It will be readily understood that wire 76 is continuously fed through openings 156 and 160 in shaft 140 and eyelet 74 from a suitable spool exteriorly of the machine, not shown.

In order to guide the wire 76 as it is carried over the top and underneath forming plate 66, and also to form the end turns of the coils being wound, shroud assemblies 190 are provided respectively secured to forming plate 66 on the side thereof remote from block 68 and respectively above and below core 30, each shroud assembly 190 comprising an inner part 192 and an outer part 194, as shown in FIGS. 1 and 3, it being understood that the outer shroud part 194 is not shown in the lower half of FIG. 3.

Shroud parts 194 are provided with recess 195 shown in dashed lines in FIG. 3 into which the upper and lower ends 197 and 199 of the inner wire guide members 162 and 164 respectively slide when in their inner positions.

It will be observed that the edges 182 and 184 of the outer wire guide members 168 are respectively tapered outwardly toward their ends 185 and 187, as at 189, this taper being the same as that of edges 201 of shroud assembly 190 thus accommodating the outer guide members 166 and 168 in their inner positions.

It will be readily comprehended that if the coil winding machine is to be employed for winding coils having only one predetermined span, the inner wire guide members 162 and 164 and the outer guide members 166 and 168 may be fixed with openings 186 and 188 in alignment respectively with the slots of the core 30 to be wound. However, when two concentric coils are to be wound into pairs of angularly displaced slots, as in the case of the core shown in FIGS. 11 and 12, it is necessary that the inner guide members 162 and 164, and the outer guide members 166 and 168 be moved from a first position in which the openings 186 and 188 are respectively in alignment with the core slots 54a and 54b, to a second position in which the openings are respectively in alignment with the core slots 54d and 54e. It will be observed further that the movement of the wire guide members and more particularly the edges 174 and 176 of the inner wire guide members 162 and 164, and the edges 182 and 184 of the outer wire guide members 166 and 168, must be along arcuate paths coaxial with the axis of the core 30. In order to provide this movement of the wire guide members, the arrangement now to be described is provided.

Referring to FIGS. 4 and 7 through 10, a rectangular opening 196 is formed in the forming plate 66 coaxial with axis 136 and communicating with an opening 198 formed in block 68. Guide plate members 200 and 202 are respectively positioned in openings 196 and 198 having their facing surfaces 204 and 206 respectively in spaced parallel relationship and disposed in planes perpendicular to the axis of core 30, as best seen in FIG. 4. As seen in FIGS. 7 through 10, guide plate members 200 and 202 respectively have portions 208 and 210 extending forwardly of forming plate 66 toward peripheral face 56 of core 30. Arcuate slots 212 are respectively formed in faces 204 and 206 of guide plate members 200 and 202, the arcuate slots 212 being largely formed in that portion of the faces 204 and 206 lying in portions 208 and 210. Arcuate slots 212 are coaxial with the axis of core 30 and respectively have equal radii therefrom.

A generally rectangular, axially movable plate member 214 is provided disposed in openings 196 and 198 on the axis 136 and having its opposite faces 216 and 218 respectively parallel with and spaced from faces 204 and 206 of the guide plate members 200 and 202. Plate member 214 is axially movable between a first outer position as shown in FIG. 9 and a second retracted position as shown in FIG. 10, as will be hereinafter more fully described. Diagonal grooves 220 and 222 are respectively formed in the opposite faces 216 and 218 of the movable plate member 214, the grooves 220 and 222 being transverse with respect to each other as seen in FIGS. 9 and 10.

The inner wire guide members 162 and 164 respectively have projections 224 and 226 extending at right angles thereto in planes perpendicular to the axis of core 30. Projection 224 of wire guide member 162 extends into the space between upper surface 204 of the lower guide plate member 200 and the lower surface 216 of movable plate member 214, and the projection 226 of wire guide member 164 extends into the space between the lower surface 206 of the upper guide member 202 and the upper surface 218 of the movable plate member 214. Projection 224 of wire guide member 162 has a pair of pins 228 and 230 extending downwardly from its lower surface and slidingly seated in arcuate groove 212 of the lower guide plate member 200. Projection 224 further has another pin 232 extending upwardly and slidingly seated in the diagonal groove 220 in the lower surface 216 of the movable plate member 214. Likewise, projection 226 of wire guide member 164 has two pins 234 and 236 extending upwardly from its upper surface and slidingly seated in the arcuate groove 212 in the lower surface 206 of the upper guide plate member 202. Projection 226 further has another pin 238 extending downwardly from its lower surface slidingly seated in groove diagonal 222 in the upper surface 218 of the movable plate member 214.

Inspection of FIGS. 7 through 10 inclusive will now reveal that when the movable plate member 214 is in its forward position, as shown in FIG. 9, pins 232 and 238 are respectively disposed at the rear ends of diagonal slots 220 and 222 of the movable plate member 214, and pins 230 and 234 of projections 224 and 226 are respectively adjacent the outer ends of arcuate slots 212 so that the edges 174 and 176 of the wire guide members 162 and 164 are respectively in their outer positions, i.e. so that the elongated openings 186 and 188 are respectively in alignment with the outer pair of slots 54d and 54e. It will be seen further that when the movable plate member 214 is moved axially in the direction shown by the arrow 240, pins 232 and 238 are respectively moved to the inner ends of diagonal slots 220 and 222 in surfaces 216 and 218 of movable plate member 214 thus causing the pins 228 and 230 on projection 224 to move along the arcuate slot 212 of guide plate member 200 in the direction shown by the arrow 242, and the pins 234 and 236 of the projection 226 similarly to move in arcuate slot 212 of guide plate member 202 in the direction shown by the arrow 244. This results in movement of the inner wire guide members 162 and 164 and particularly their edges 174 and 176 in arcuate paths from their first or outer positions as shown in FIGS. 7, 9 and 12 to their second or inner positions as shown in FIGS. 8, 10 and 11 in which the elongated openings 186 and 188 are respectively in axial alignment with the inner pair of core slots 54a and 54b.

In order to move plate 214 between its first or outer position as shown in FIG. 9 and its second or inner position as shown in FIG. 10, plate member 214 is provided with a pair of arms 246 and 248 respectively extending through slots 250 and 252 formed in projection 130 of block 68 on either side of block 144 as best seen in FIGS. 2 and 5. An axially slidable sleeve 254 is coaxially positioned on shaft part 138 and is provided with annular groove 256 formed in its end toward block 68. Arms 246 and 248 respectively have inturned end portions 258 and 260 slidably seated in groove 256 of sleeve 254. It will now be seen that sleeve 254 may rotate with respect to arms 246 and 248 of movable plate member 214, however, that axial movement of sleeve 254 on shaft part 138 in the direction 240 will result in corresponding movement of arms 246 and 248 and of plate member 214.

It will be observed that the mechanism to provide the requisite axial movement of sleeve 254 must not interfere with the conical path of movement of wire 76 between opening 160 in shaft part 140 and eyelet 74. To accomplish this, a push collar 262 is mounted on shaft part 140 rearwardly of opening 160, push collar 262 being secured to rotate with shaft part 140 but to be axially slidable thereon by means of a key 264. Sleeve 254 has a flange 266 formed at its end remote from block 68, flange 266 being secured to push collar 262 by means of two studs 268 and 270. It will be observed by reference to FIG. 6 that opening 160 in the peripheral surface of shaft part 140 lies in a plane passing through axis 136 which is perpendicular to the plane of studs 268 and 270. A drive shaft 272 is provided journalled in bearings 274 and 276 and respectively secured to frame members 128 and 152. Drive shaft 272 has a splined connection 278 with another drive shaft 280 of a source of driving power (not shown); splined connection 278 accommodates movement of movable base plate 78. Shaft assembly 134 comprising shaft parts 138 and 140 is rotated by means of a sprocket 282 at its end 146 driven from a sprocket 284 on shaft 272 by means of a suitable chain 286. It will now be observed that when the shaft assembly 134 is rotated by means of sprocket 282, push collar 262, studs 268 and 270, and sleeve 258 will likewise be rotated, opening 160 in shaft part 140 likewise rotating and maintaining the same relationship with the studs 268 and 270. As will be explained hereinafter, the chain 60 is driven at the same rotational speed as the shaft assembly 134 and thus the wire 76 is carried around forming plate 66 without interference with sleeve 254, push collar 262 or studs 268 and 270.

In order to move push collar 262 axially thereby to move plate member 214 in the direction 240, and to shift the inner wire guide members 162 and 164 between their first and second positions, as above described, a hydraulic cylinder 288 is provided mounted on a frame element 290 which is in turn mounted on the movable base plate member 78. Hydraulic cylinder 288 has its piston rod 290 connected to a block 292 which is guided for axial movement by means of a suitable guide 294. Block 292 has a pair of arms 296 and 298 respectively having rollers 300 and 302 thereon seated in groove 304 of push collar 262. It will be readily seen that the axes of rollers 300 and 302 lie on radii of push collar 262 and thus accommodate rotation of the push collar. It will be seen further that when the hydraulic cylinder 288 is actuated to move piston rod 290 in the direction shown by the arrow 306, push collar 308 is moved axially in the same direction on shaft part 140 thus in turn moving sleeve 254 and plate member 214 from its position as shown in FIG. 9 to the position shown in FIG. 10.

Referring now to FIGS. 3, 11 and 12, in order to provide the requisite arcuate movement of the outer wire guide members 166 and 168, these wire guide members are respectively provided with projections 308 and 310 extending outwardly in a plane perpendicular to the axis of core 30. Projections 308 and 310 are elongated, extending in opposite directions and are respectively slidably supported for longitudinal movement in pillow blocks 312 and 314. Pillow blocks 312 and 314 are in turn pivotally supported on frame elements 316 and 318 by means of suitable pivot pins 320. Frame elements 316 and 318 are in turn secured to movable base plate member 78. Each of the pivoted pillow blocks 312 and 314 has an elongated slot 322 formed in its upper surface parallel with the respective projections 308 and 310, as best seen in FIGS. 11 and 12. A pair of elongated actuating members 324 and 326 are provided respectively extending parallel with shafts 112 and 114 with their outer ends 328 resting upon the upper surfaces of pivoted pillow blocks 312 and 314. Actuating members 324 and 326 are supported for axially sliding movement by guide members 330 and 332 respectively secured to the outer edges of frame portions 96 and 98, and guide members 334 and 336 respectively mounted on frame element 290.

Actuating members 324 and 326 are connected together by a transverse actuating element 338 which in turn is secured to block 292. It will thus be seen that when hydraulic cylinder 288 is actuated to move piston rod 290 in the direction 306, actuating members 324 and 326 are likewise moved axially in that direction by means of transverse rod 338.

A diagonal slot 340 is formed in the end 328 of each actuating member 324 and each of the projections 308 and 310 of the outer guide members 166 and 168 has a pin 342 secured thereto and extending upwardly through elongated slot 322 in the respective pillow block 312, 314 and through the respective diagonal slot 340.

The rear ends 344 of the projections 308, 310 of the outer wire guide members 166 and 168 are respectively supported on blocks 346 and 348 mounted on frame elements 316, 318. Each of the blocks 346, 348 has an arcuate slot 350 formed in its upper surface and each of the ends 344 of the projections 308, 310 has a pin 352 secured to its bottom surface and extending downwardly into the respective arcuate slot 350 for sliding movement therein.

It will now be observed that when the outer wire guide members 166 and 168 are in their first or outer positions, i.e. when the elongated openings 186 and 188 respectively in alignment with the outer pair of slot 54d and 54e, as shown in FIG. 12, pins 352 are at the rear ends of slots 350, and pins 342 are at the rear ends of slots 322 and 340. It will further be observed that when the actuating members 324 and 326 are moved from their first positions as shown in FIG. 12 to their second positions as shown in FIG. 11 in the direction 306 as above described, pins 342 are moved to the forward ends of slots 322 and 340 thus moving projections 308, 310 of the outer wire guide members 166 and 168 inwardly in the directions shown by the arrow 354 this movement causing the pins 352 to move to the inner ends of the arcuate slots 350 thereby moving the outer ends 344 of projections 308, 310 in an arc as shown by the arrow 356 and in turn causing wire guide members 166 and 168 and particularly their edges 182 and 184 to move in arcuate paths coaxial with core 30 to their second or inner positions as shown in FIG. 11, with the elongated openings 186 and 188 respectively in alignment with the inner pair of core slots 54a and 54b.

Shafts 112 and 114 are rotated at such speeds that sprocket wheels 108 and 110 drive chain 60 at the same rotational speed as shaft assembly 134 by means of gears 358 and 360 respectively secured on ends 120 and 122 of shafts 112 and 114, gears 358 and 360 respectively meshing with and being driven by gear 362 mounted on shaft 272 intermediate frame members 128 and 152.

It will now be seen that I have provided a machine for winding coils directly into the slots of an externally slotted magnetic core member, the machine further permitting the consecutive winding of concentric coils in two pairs of angularly displaced slots.

While I have described and illustrated mechanisms for shifting the inner wire guide members 162 and 164 and the outer wire guide members 166 and 168 in arcuate paths between first and second positions, thereby to permit the winding of concentric coils, it will be readily understood that for winding individual coils in a single pair of slots, the wire guide members may be affixed in their proper positions with the elongated openings 186 and 188 respectively in radial alignment with the slots in which the coils to be wound and the wire guide member shifting apparatus described above may therefore be dispensed with. In this case, shaft 134 may also be dispensed with if the coils being wound do not build up sufficiently to exert thrust on the winding chain assembly. Further, while my improved coil winding apparatus has been described and illustrated in connection with a winding of field coils of the distributed winding type in an externally slotted dynamoelectric machine core member, my apparatus is equally applicable for winding the coils of an externally slotted dynamoelectric machine stator core member of the shaded pole type.

While I have illustrated and described a particular embodiment of my invention, further modifications and improvements will occur to those skilled in the art and I desire therefore in the appended claims to cover all modifications which do not depart from the spirit and scope of my invention.

What is claimed is:

1. In combination: an externally slotted core member having at least two slots extending inwardly from an external face thereof; and apparatus for winding a coil in said two slots comprising endless flexible wire carrying means spaced from said core face, means interiorly of said carrying means for forming the carrying means into two runs respectively parallel with said two slots, means exteriorly of said carrying means for driving the same, said carrying means having means thereon and driven therewith for feeding a continuous length of wire to said core; first wire guide means on said forming means having edges respectively spaced from said core face and parallel with said two runs of said carrying means; and a pair of second wire guide means having edges respectively spaced from said core face and closely spaced from said first wire guide means and parallel therewith, respective first and second wire guide means edges being positioned adjacent said two slots for guiding said length of wire from said feeding means into said two slots.

2. In combination: an externally slotted, cylindrical dynamoelectric machine core member having a spaced plurality of parallel slots extending inwardly from its peripheral face; and apparatus for winding a coil in two of said slots comprising endless flexible wire carrying means disposed in a plane spaced from said core face, means interiorly of said carrying means for forming the carrying means into two runs respectively parallel with said two slots, frame means exteriorly of said carrying means, means on said frame means for driving said carrying means, said carrying means having means thereon and driven therewith for feeding a continuous length of wire to said core, a pair of first elongated wire guide means mounted on said forming means and respectively having edges parallel with said two runs of said carrying means, and a pair of second elongated wire guide means mounted on said frame means, said second wire guide means respectively having edges parallel with said first wire guide means and closely spaced therefrom to define elongated openings therebetween, said wire guide means being closely spaced from said core face with said elongated openings respectively in alignment with said two slots for guiding said length of wire from said feeding means into said two slots.

3. The combination of claim 1 wherein said carrying means is disposed in a plane, and further comprising an elongated shaft perpendicular to said plane on the side thereof remote from said core, said shaft having one end journalled in said forming means, said shaft having a coaxial opening therein extending from its other end toward said one end, said shaft having another opening in the peripheral surface thereof communicating with said coaxial opening, said length of wire extending through said coaxial and other openings, means for rotatably supporting said shaft between said other end and other opening, and means for rotating said shaft at the same rotational speed as said carrying means.

4. The combination of claim 2 wherein said first and second guide means are selectively movable between first positions with said elongated openings respectively in alignment with a first pair of slots in said core, and second positions with said elongated openings respectively in alignment with a second pair of slots in said core respectively angularly spaced from said first pair of slots whereby two concentric coils may be consecutively wound in said first and second pairs of slots.

5. The combination of claim 2 further comprising means on said forming means for moving said first guide means edges in arcuate paths between first and second positions and means on said frame means for moving said second guide means edges in arcuate paths between first and second positions, said arcuate paths being coaxial with said core, said elongated openings being respectively in alignment with a first pair of slots in said core in the first positions of said guide means, and with a second pair of slots in said core respectively angularly spaced from said first pair of slots in the second positions of said guide means whereby two concentric coils may be consecutively wound in said first and second pair of slots.

6. Apparatus for winding a coil in two slots of an externally slotted, cylindrical dynamoelectric machine core member having a spaced plurality of parallel slots extending inwardly from its peripheral face, said apparatus comprising: means for supporting a core to be wound concentric with its axis; an endless chain disposed in a plane spaced from said core face and parallel with said core axis; a forming member within said chain and forming the chain into two runs respectively parallel with the core slots in which said coil is to be wound; a frame exteriorly of said chain, said supporting means being mounted on said frame; a sprocket mounted on a first shaft journalled in said frame and operatively engaging said chain for continuously driving the same in one direction; said chain having an aperture therein for feeding a continuous length of wire to said core; a pair of first elongated wire guide members mounted on said forming member and having edges respectively parallel with said two runs of said chain; and a pair of second elongated wire guide members mounted on said frame, said second wire guide members having edges respectively parallel with said first wire guide members and closely spaced therefrom to define elongated openings therebetween, said wire guide members being closely spaced from said core face and positioned so that said elongated openings are respectively in alignment with the core slots in which said coil is to be wound thereby to guide said length of wire from said aperture into said two slots.

7. The combination of claim 6 further comprising: a second shaft having one end rotatably journalled in said forming member on the side thereof remote from said core and extending therefrom perpendicular to said core axis, said second shaft having a coaxial opening therein extending from its other end a part of the way toward said one end, said second shaft having another opening extending inwardly from its peripheral surface and communicating with said coaxial opening, said length of wire extending through said coaxial and other openings; bearing means rotatably supporting said second shaft on said frame between said other end of said second shaft and said second opening; and means for driving said shafts at speeds such that said second shaft and chain are driven at the same rotational speed.

8. The combination of claim 6 further comprising first means on said forming member coupled to said first wire guide members and movable between first and second positions for moving said first wire guide member edges in arcuate paths between first and second positions; second means on said frame coupled to said second wire guide members and movable between first and second positions for moving said second wire guide member edges in arcuate paths between first and second positions; said arcuate paths being coaxial with said core, said elongated openings being respectively in alignment with a first pair of slots in said core in the first position of said wire guide members, and with a second pair of slots in said core respectively angularly spaced from said first pair of slots in the second position of said wire guide members whereby two concentric coils may be consecutively wound in said first and second pair of slots; an elongated axially movable member having one end rotatably connected to said first moving means and extending from the side of said forming member remote from said core on another axis perpendicular to said core axis; an actuating member connected to the other end of said axially movable member and having an aperture therein concentric with said other axis, said length of wire extending through said last named aperture to said chain aperture; means on said frame supporting said actuating member for rotation about said other axis and for axial movement with respect thereto between first and second positions; means for rotating said actuating member and first shaft at speeds such that said actuating member and chain are driven at the same rotational speed; operating means for selectively moving said actuating member axially between first and second positions thereby moving said first moving means between its first and second positions; and means coupling said operating means and said second moving means for moving the same between its first and second positions simultaneously with movement of said first moving means whereby two concentric coils may be consecutively wound in said first and second pair of core slots.

9. Apparatus for winding a coil in a pair of slots of an externally slotted, cylindrical dynamoelectric machine core member having a spaced plurality of winding slots extending inwardly from its peripheral face, said apparatus comprising: means for supporting a core to be wound concentric with its axis; an endless chain disposed in a plane spaced from said core face and parallel with said core axis; a forming bloc within said chain having a portion forming and guiding the inner side of said chain into two runs respectively parallel with said core slots; a frame having a base portion and portions respectively upstanding on either side of said forming block, said supporting means being mounted on said base portion; a pair of sprocket wheels respectively mounted on first and second shafts and respectively meshing with the outer side of said two runs of said chain for continuously driving the same in one direction, said first and second shafts being respectively journalled in said upstanding portions of said frame, said chain having an aperture therein for feeding a continuous length of wire to said core; a pair of first elongated wire guide members having edges respectively parallel with said two chain runs and disposed on the side of said block toward said core, said first wire guide members being mounted on said forming block; a pair of second elongated wire guide members having edges respectively parallel with the edges of said first wire guide members and closely spaced therefrom respectively to define elongated narrow openings, said second wire guide members being mounted on said frame, said wire guide member edges being closely spaced from said core face and said elongated openings being respectively in alignment with said pair of slots for guiding said length of wire thereto; a third elongated shaft having one end journalled in thrust bearing means secured to the side of said forming block remote from said core and extending outwardly on a second axis perpendicular to said core axis, said third shaft having a coaxial opening formed therein from its other end a part of the way toward said one end, said third shaft having another opening in its periphery communicating with said coaxial opening; said length of wire passing through said coaxial and other openings to said chain aperture; bearing means mounted on said frame base portion and rotatably supporting said third shaft intermediate said other end and said other opening; means intermediate said other opening and said other end of said third shaft for rotating the same; and means for rotating said first and second shafts at such speed that said chain is driven at the same rotational speed as said third shaft.

10. The combination of claim 6 wherein said forming member has an opening extending therein from its side facing said core on a second axis perpendicular to said core axis, opposed means in said opening in spaced parallel relationship and respectively lying in planes perpendicular to said core axis, said opposed means respectively having arcuate grooves formed therein coaxial with said core axis; and further comprising a plate member positioned in said opening for sliding movement along said second axis between a first position toward said core and a second position retracted therefrom, the opposite faces of said plate member being respectively spaced from and parallel with said opposed means in said opening and respectively having diagonally extending grooves formed therein, said grooves being transverse to each other; each of said first wire guide members having a projection extending therefrom, said projections respectively extending into the spaces between said plate member and said opposed means in said opening, each of said projections having means seated in the arcuate groove of the adjacent opposed means in said opening for guiding the same for movement in an arcuate path defined by said arcuate groove, each of said projections having means seated in the respective diagonal groove of said plate member whereby movement of said second plate member between its first and second positions causes said first wire guide members to move in arcuate paths between first outer and second inner positions; means respectively mounting said second wire guide members on said frame for movement in arcuate paths between first outer and second inner positions; said arcuate paths being coaxial with said core axis; said edges of said first and second wire guide members in their first and second positions being closely spaced from said core face, said edges of said first wire guide members in their first and second positions defining elongated narrow openings with respective edges of said second wire guide members in their first and second position for guiding said length of wire from said chain aperture into said core slots, said elongated openings in said first and second positions of said wire guide members being respectively aligned with first and second pairs of slots, said second pair of slots being between said first pair of slots; and means for simultaneously moving said plate member and said second wire guide members between said first and second positions thereof thereby consecutively to wind said two concentric coils in said first and second pairs of slots.

11. The combination of claim 9 wherein said forming block has a first portion at one end thereof which forms said chain into said two runs, said forming block having a second portion extending on the side of said chain remote from said core; said forming block having an opening extending therein from said one end thereof on said second axis; and further comprising a pair of first plate members mounted in said opening in spaced parallel relationship and respectively lying in planes perpendicular to said core axis, the facing surfaces of said first plate members respectively having arcuate grooves formed therein, said grooves being coaxial with said core axis; a second plate member positioned in said opening for sliding movement along said second axis between a first position toward said core and a second position retracted therefrom, the opposite faces of said second plate member being respectively spaced from and parallel with said first plate member faces and respectively having diagonally extending grooves formed therein, said grooves being transverse to each other; each of said first wire guide members having a projection extending inwardly therefrom in a plane perpendicular to said core axis, said projections respectively extending into the spaces between said second plate member and said first plate members, each of said projections having two pins seated in the arcuate groove of the adjacent first plate member and another pin seated in the respective diagonal groove of said second plate member whereby movement of said second plate member between its first and second positions causes said first wire guide member to move in arcuate paths between first outer and second inner positions; each of said second wire guide members having an elongated projection extending outwardly therefrom in a plane perpendicular to said core axis, said second wire guide member projections respectively extending in opposite directions; a pair of pillow blocks respectively pivotally mounted on said frame base portion and respectively mounting said second wire guide member projections intermediate their ends for longitudinal sliding movement; a pair of support blocks mounted on said frame base portion and respectively supporting the outer ends of said projections of said second wire guide members, each of said support blocks having an arcuate slot therein, each of said projections of said second wire guide members having a pin seated in the slot of the respective support block; a pair of elongated actuating members respectively extending generally transversely of said second wire guide member projections and longitudinally movable between first and second positions; each of said pillow blocks having an elongated slot formed therein parallel with the respective second wire guide member projection; each of said actuating members having a diagonal slot formed therein adjacent one end; each of said second wire guide member projections having a pin seated in the slots of the respective pillow block and actuating member whereby movement of said actuating member between said first and second positions thereof causes said second wire guide members to move in arcuate paths between first outer and second inner positions; said arcuate paths being coaxial with said core axis; said edges of said wire guide members in their first and second positions being closely spaced from said core face, said edges of said first wire guide members in their first and second positions defining elongated narrow openings with said edges of respective second wire guide members in their first and second positions for guiding said length of wire from said chain aperture into said core slots, said elongated openings in said first and second positions of said wire guide members being respectively aligned with first and second pairs of slots, the second pair of slots being between the first pair of slots; and means for simultaneously moving said second plate member and said actuating members between their first and second positions thereby consecutively to wind two concentric coils in said first and second pairs of slots.

12. The combination of claim 11 wherein said second plate member has projections respectively extending through openings in said forming block on either side of said thrust bearing means; and further comprising a sleeve coaxially mounted on said third shaft between said one end and said other opening and axially movable thereon, said sleeve at its one end adjacent said one end of said third shaft having a rotating connection with said second plate member projections; a push collar on said third shaft between said other opening and said bearing means; means connecting said push collar to said third shaft to rotate therewith but to permit axial movement of said push collar on said third shaft; means connecting said push collar and the other end of said sleeve and defining an opening, said length of wire passing through said last-named opening from said other opening to said chain aperture; and wherein said simultaneous moving means comprises operating means operatively connected to said push collar for axially moving the same on said third shaft between first and second positions thereby moving said second plate member between said first and second positions thereof, and means connecting said operating means and said actuating means thereby moving the same between said first and second positions thereof simultaneously with movement of said push collar.

13. The combination of claim 6 further comprising first means on said forming member coupled to said first wire guide members and movable between first and second positions for moving said first wire guide member edges in arcuate paths between first and second positions; second means on said frame coupled to said second wire guide members and movable between first and second positions for moving said second wire guide member edges in arcuate paths between first and second positions; said arcuate paths being coaxial with said core, said elongated openings being respectively in alignment with a first pair of slots in said core in the first position of said wire guide members, and with a second pair of slots in said core respectively angularly spaced from said first pair of slots in the second position of said wire guide members whereby two concentric coils may be respectively wound in said first and second pair of slots; and means for simultaneously moving said first and second means between said first and second positions thereof whereby two concentric coils may be wound in said first and second pair of wire slots.

References Cited in the file of this patent

UNITED STATES PATENTS

| | | |
|---|---|---|
| 1,255,712 | Crane | Feb. 5, 1918 |
| 1,503,254 | Sippel et al. | July 29, 1924 |
| 1,635,677 | Jones et al. | July 12, 1927 |
| 2,738,136 | Bugg | Mar. 13, 1956 |

FOREIGN PATENTS

| | | |
|---|---|---|
| 235,810 | Germany | June 21, 1911 |